United States Patent [19]

Inoue

[11] Patent Number: 4,778,659
[45] Date of Patent: Oct. 18, 1988

[54] MIXING METHOD OF REACTION RAW-MATERIAL

[75] Inventor: Takao Inoue, Hirakata, Japan

[73] Assignee: Matsushita Electric Industrial Co., Ltd., Osaka, Japan

[21] Appl. No.: 887,922

[22] Filed: Jul. 22, 1986

[30] Foreign Application Priority Data

Jul. 23, 1985 [JP] Japan .................................. 60-162419
Oct. 24, 1985 [JP] Japan .................................. 60-238039

[51] Int. Cl.⁴ .......................... B01F 5/04; B01F 15/02; C08G 59/00; B08B 3/04
[52] U.S. Cl. ..................... 422/135; 134/24; 134/169 R; 264/39; 264/331.11; 264/331.19; 264/331.21; 264/DIG. 83; 422/210; 422/229; 526/64; 526/65; 528/86; 528/323; 528/326
[58] Field of Search .............. 264/54, 51, 53, DIG. 83, 264/331.11, 331.19, 331.21, 39; 521/917; 425/543, 817 R; 422/210, 229, 133; 526/88, 64, 65; 528/86, 323, 326; 134/24, 169 R

[56] References Cited

U.S. PATENT DOCUMENTS

| | | | |
|---|---|---|---|
| 2,658,736 | 11/1953 | Alderfer | 521/917 X |
| 2,847,196 | 8/1958 | Franklin et al. | 134/169 R X |
| 2,957,207 | 10/1960 | Roop et al. | 264/54 |
| 2,969,960 | 1/1961 | Gurley, Jr. | 521/917 X |
| 3,090,078 | 5/1963 | Ackles | 264/54 X |
| 3,111,389 | 11/1963 | Hansen et al. | 521/917 X |
| 3,212,128 | 10/1965 | Carlson et al. | 264/54 X |
| 3,306,540 | 2/1967 | Reichert | 521/917 X |
| 3,385,671 | 5/1968 | Axelsson | 521/917 X |
| 3,393,052 | 7/1968 | Axelsson | 521/917 X |
| 3,902,850 | 9/1975 | Lehnert | 521/917 X |
| 4,040,606 | 8/1977 | Mueller | 134/169 R X |
| 4,246,041 | 1/1981 | Lillo | 134/24 X |
| 4,404,360 | 9/1983 | Hartmann | 526/65 X |
| 4,671,942 | 6/1987 | Dietachmair | 134/24 X |

FOREIGN PATENT DOCUMENTS 1806396 6/1969 Fed. Rep. of Germany .
2809228 9/1979 Fed. Rep. of Germany .

OTHER PUBLICATIONS

Dickert, E. A., W. A. Himmler, D. E. Hipchen, M. Kaplan, H. A. Silverwood, and R. Zettler, "Molding of One-Shot Rigid Urethane Foam," In *Chemical Engineering Progress,* (vol. 59, No. 9), Sep. 1963, pp. 33–38.
Buist, J. M., "New Developments in Urethane Foams", Part 1, in *Rubber and Plastics Weekly,* Sep. 21, 1963, pp. 382, 383, 385, 386, 388, 390 and 406.
Emmerich, Anthony, Asso. Ept. "Liquid Injection Molding: Where it Stands Today," in *Plastic Technology,* Apr. 1980, pp. 92–96.
Becker, Walter E., Ept. Reaction Injection Molding, New York, Van Nostrand Reinhold, ©1979, pp. 59 and 60.
"Ciba–Geigy/Structural Adhesives/Araldite Rapid ®," Ciba–Geigy Corp., Publ. No. 24892/e, date unknown.
European Search Report for Application No. EP 86110040.2 of 10-10-1986.

Primary Examiner—Philip Anderson
Attorney, Agent, or Firm—Wenderoth, Lind & Ponack

[57] ABSTRACT

In the invention, reaction raw-materials composed of a plurality of liquids are sequentially scraped with spiral grooves of one line or more provided in the peripheral face of the rotation shaft rotating within the cylinder wall with the discharge openings being formed therein. The reaction raw-materials are uniformly mixed within the grooves by shearing force or twist force through the rotation of the shaft. The reaction raw-material, if small amount, may be precisely mixed uniformly and is sequentially discharged after the mixing operation. This is suitable for reaction raw-materials which are short in the gelatin condition time from the mixing from the hardening. Some mixtures which are discarded without being used after the mixing may be reduced.

2 Claims, 5 Drawing Sheets

MIXING METHOD OF REACTION RAW-MATERIAL

BACKGROUND OF THE INVENTION

1. Field of the Invention

The present invention relates to a mixing method of reaction materials and a mixing apparatus for performing it. Especially, they may be used in a dispenser for a two-liquid mixture type bonding agent, apparatuses of vacuum-injection type, liquid coating process molding or the like.

2. Description of the Prior Art

In the production line use of an appliance using the two-liquid mixture type bonding agent including, for example, ambient temperature hardening type expoxide resin and its hardening agent, the operator mixed, in batch processing, the epoxide resin and its hardening agent manually. The operator, for example scooped a small amount of mixture with the tip of a needle or toothpick and applied it on a given location for bonding operation.

However, after mixing the two-liquid mixture, the hardening reaction of the epoxide resin was advanced by the open ring of the epoxide group and the reaction with the functional group of the hardening agent with the hydroxyl group. It became difficult to scoop the mixture to apply it, so that most of the mixture was discarded. Also, there was the automatic dispenser adapted to the two-liquid mixing method represented by the static division mixture using the split plate or the split blade.

However, the static mixer using the conventional static division mixing method required some extent of liquid amount for the mixing operation, so that it was unsuitable to precisely mix, and discharge, a micro-amount.

Also, the gellation condition before the hardening operation was unsuitable for the mixture supply of materials of minute order or less. Further, even in the mixture of the material which was capable of maintaining the gellation condition for several tens of minutes, a washing operation was required to remove the mixture attached on the mixer, the split blades or the like.

Also, an apparatus which introduces raw materials into a given container, and compulsorily stirs the raw materials by variously shaped blade type forced stirring apparatus, an apparatus which causes the raw materials to collide against each other under the high pressure within the given narrow container to mix them, or the like was used as the mixing apparatus. However, the mixing apparatus using the blade type of forced stirring apparatus had more materials loss, because the remaining amount of the mixture liquid was large because of the relative large void. Also, the washing operation was required with gas or washing liquid, a large amount of washing gas or washing liquid being required for sufficient washing operation. Furthermore, the remaining washing liquid deteriorates the property of the matter after the hardening of the raw materials mixed thereafter, thus causing problems of production and cost, production stability. Also, the collision mixing apparatus was suitable for the mixing of liquids of low viscosity, but was not suitable for sufficient mixing of the raw materials, of high viscosity, mixed with bulking agent, was not suitable for correct mixing of small amount of raw materials without embracing air bubbles, furthermore required a high-pressure hydraulic source or the like.

SUMMARY OF THE INVENTION

Accordingly, an essential object of the present invention is to solve the above-described problems, to precisely perform the mixing ratio, the dispersion for sufficient mixing of reaction materials, of high viscosity, that is capable of mixing especially small amounts, and that includes bulking agent.

Another important object of the present invention is to provide a mixing method suitable for mixing the reaction materials of several-minute order in a gellation condition.

A further object of the present invention is to provide a mixing apparatus which will perform even if the discarded raw materials are smaller in amount in mixing and the amount of the washing liquid used after the mixing is smaller.

The present invention is a mixing method of reaction materials composed of a plurality of liquids. The mixing method of the reaction raw materials comprising the steps of relatively rotating the rotating shaft having spiral grooves of one line or more and a plurality of raw-material discharge openings formed around the rotary shaft, by scraping or scratching, introducing into the grooves of the rotary shaft the raw materials alternately from the plurality of discharge openings, of mixing the reaction raw-materials of the plurality of liquid. Further, to ensure the mixing operation, this method comprises the steps of releasing into the mixing space the raw materials of a plurality of liquids scraped into the grooves and stirring them, mixing the reaction materials of a plurality of liquids. Further, it is preferable to retain, control of the temperature of the mixing portion for extending the gellation time of the reaction raw-material.

Also, an apparatus for embodying the mixing method is provided with a rotary shaft having grooves of one line or more on the outer peripheral face, a cylinder having the shaft passed through longitudinally, a pressure transfer means for sending the reaction raw-materials into the grooves of the outer peripheral face of the rotary shaft within the cylinder from a plurality of raw-material tanks, and a driving means axially movable axially movable, the rotation shaft is adapted to assume the for being exposed externally of the cylinder. Thus, the mixing head may be provided which does not require the washing liquid with the precise mixing and after the mixing, and may be wiped externally. Also, in addition to the above construction, a temperature control means is provided which is capable of pressure-transferring the reaction materials and of temperature-adjusting the required portions of the mixing route.

By the use of the above-described means, one type of raw material is discharged, fed while the raw-material discharge opening conforms or aligns with the groove of the rotation shaft by the rotation of the rotation shaft, and another type of raw material is in the next discharge opening discharged fed into the groove. When the revolution number of the shaft is rotated at the high speed of about 100 through 3200 rpm and by the repetition of it, the raw material is fed, filled into fine layers and is mixed. Thus, the precise mixing may be performed by the shearing force developed between the grooves of the shaft and the cylinder wall face. Furthermore, a plurality of liquid raw materials within the grooves are released into the mixing space for the final stirring operation so that they are mixed more sufficiently. When the number of revolutions is great, the raw materials to be mixed are two or more liquids, the strong shearing forces work between the shaft grooves and the cylinder wall face, so that sufficient mixing is performed even without the further stirring in the raw-material releasing condition for further reaction. Also, if the rotation shaft is axially moved after the continuous injection of the given mixture and the rotation shaft is projected, released externally of the cylinder, then the raw materials remaining in the grooves may be wiped out, thus allowing the mixing apparatus to be easily washed, which was conventionally difficult to perform. As described hereinabove, according to the present invention, the new reaction raw-materials are normally fed into the grooves without air bubbles being entrained in the mixture when the mixture is continuously discharged, the mixture may be stably fed more than five times the gellation time to achieve the washing operation of the grooves. Also, in the present apparatus, the mixture portion is controlled in temperature with respect to the particular reaction raw-materials into the temperature of about several hours or more in the gellation time, so that it may be continuously used during the eight hour labor.

Also, another invention of the present application is to provide a mixing head suitable for the mixing of reaction raw-materials which have only several tens of minutes of gellation time, and are fast hardening. Thus, washing method is to improve the sufficient mixing method. Namely, in the mixing apparatus wherein the rotation shaft having grooves of one line or more, a plurality of raw-material discharge openings formed around the rotary shaft are relatively rotated to feed, mix into the grooves the raw materials of two types or more from the raw-material discharge openings, washing openings for feeding the washing fluid are provided in a position deviated in the axial direction of the rotation shaft with respect to the raw-material discharge openings. And, there are means for moving the rotation shaft in the axial direction so that the grooves of the rotation shaft conform with the raw-material discharge openings during the raw-material discharge operation, the portions of the rotation shaft wherein the grooves are not provided conform with the raw-material discharge openings, and the grooves conform with the washing openings. In this case, the mixture flows into the grooves into the rotary shaft, and the washing fluid flows into the same locations, so that the washing operation may be completely performed within a short time. Also, during the washing operation, the raw-material discharge openings are blocked in the portions, without grooves, of the shaft, and the washing liquid and the washing gas do not reach onto the side of the raw-materials within the tank, also the small remaining capacity of the washing fluid will do. Thus, if the remaining fluid is discarded after the completion of the washing operation, the stable reaction may be retained. It is convenient to rotate the rotation shaft for the introduction passage into the grooves of the washing liquid and the discarding of the remaining liquid. Thus, during the washing operation, the rotation shaft moves in the direction of the injection opening, the discharge openings of the raw materials come into contact against the portion of the rotation shaft where no grooves are provided. The washing fluid from the washing discharge openings is quickly discharged from the injection opening without flowing onto the side of the raw-material discharge opening.

BRIEF DESCRIPTION OF THE DRAWINGS

These and other objects and features of the present invention will become apparent from the following description taken in conjunction with the preferred embodiments thereof with reference to the accompanying drawings, in which:

FIG. 4 is the schematic view where the present invention has been applied to a liquid casting process molding machine for urethane, nylon, polyester amide or the like;

DETAILED DESCRIPTION OF THE INVENTION

Figure 1A:
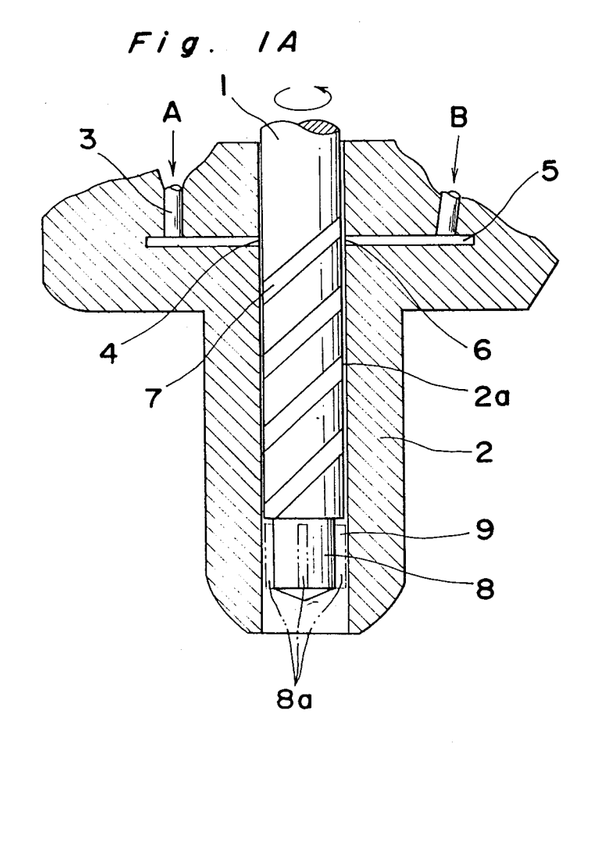
FIGS. 1A and 1B show a sectional view of the nozzle portion of a mixing apparatus in one embodiment of the present invention.

Referring now to the drawings, there is shown in FIG. 1 a mixing nozzle portion embodying the mixing method. More particularly, it is composed of a rotation shaft 1 (actually, a drill for working use is used) having grooves in it, a nozzle main body 2 having a cylinder 2a, through which the rotation shaft longitudinally extends, feed routes 3 and 5 for feeding the reaction raw-materials A and B; main agent and hardening agent (e.g. ARALDITE RAPID, the trade name of a liquid epoxy resin adhesive manufactured by Ciba Geigy Co., Ltd. of Basel, Switzerland) to the grooves 7 in the outer periphery of the rotation shaft 1 within the nozzle main-body 2, discharge openings 4 and 6 in contact against the outer peripheral face of the rotation shaft 1. The tip end of the rotation shaft, in the more preferable shape, is made narrower than the shaft so that the tip end 8 of relatively small diameter ensures complete mixing along with the mixing space 9 made thereby. Furthermore, a stirring blade 8a is provided, if necessary, as shown in the broken line around the tip end portion 8 of small diameter.

Figure 2:
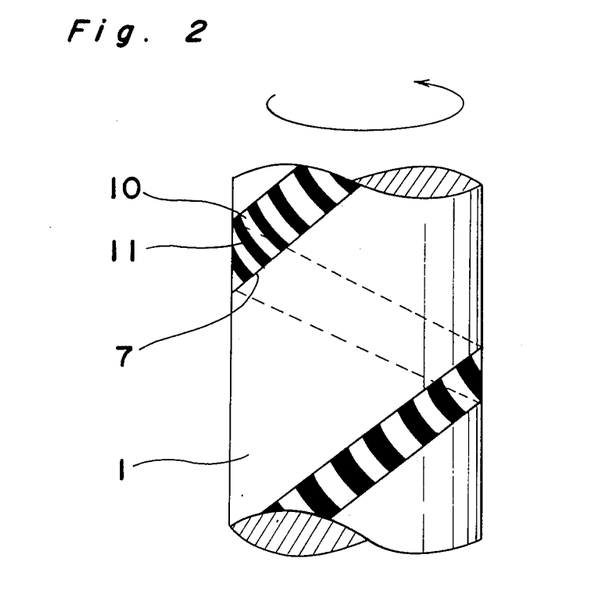
FIG. 2 is a partial view of the rotation shaft showing the mixing method of the present invention.

The concrete method of mixing method of the reaction raw-materials. The raw materials A and B which are fed under pressure into the raw-material discharge openings 4 and 6 as shown are waited for. The raw material A is fed into the grooves, only during the time in which the groove 7 aligns with discharge opening 4, by the rotation of the rotation shaft. Similarly, the raw material B is fed into the groove 7 by the next discharge opening 5 so that the scraping portion 10 of the raw material A and the scraping portion 11 of the raw material B are scraped into the groove 7 in the prag shape and the layer shape and are filled as shown in FIG. 2. While this operation is repeated, the raw materials are sufficiently mixed by undergoing the shearing force through the viscous resistance between the cylinder and the raw materials within the groove. The raw materials reach the tip end portion of the rotary shaft 1, are released into the mixing space 9, and are precisely mixed by the stirring operation. The unit amount of the scraping portions 10 and 11 are provided in a micro-amount as a function of rotation-shaft thickness, revolutions per unit time, groove depth, raw-material viscosity, and pressure applied to the raw materials to allow the precise mixing operation in micro-amount to be performed. Also, the sufficient mixing operation may be achieved, without releasing stirring operation through the faster rotation of the rotation shaft, such that increased shearing force results between the shaft and the cylinder peripheral wall. Further, the timing adjustment of the pressure feeding is added to control the total mixture discharging amount from the nozzle main body 2.

Figure 1B:
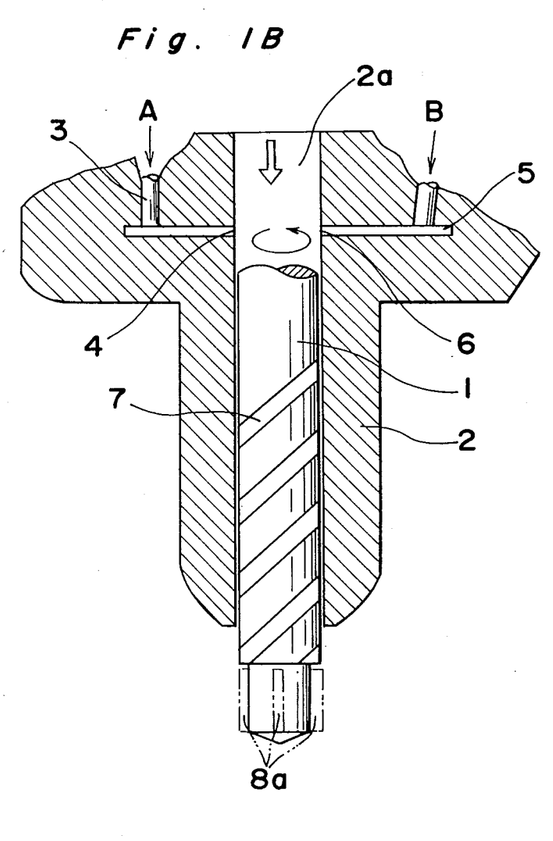

Also, in the given construction of the present embodiment, the rotation shaft 1 may be easily exposed externally of the cylinder 2a by the movement, as shown in FIG. 1B, of the rotation shaft 1 from the state of FIG. 1A in the axial direction, so that the washing operation may be easily performed by a wiping operation of the grooves 7. Also, a semiconductor thermo-module is disposed in the mixing portion, the portion is cooled to 5° C. or lower so that the gellation time to the hardening point may be extended from three minutes to about two hours. The continuous injection may be performed in the mixing apparatus by the rotation shaft composed of the drill through the above-described construction, the mixing discharging of the room-temperature hardening type epoxide bonding agent which does not have about three minutes or five minutes gellation time may be continuously performed in a method of externally releasing the drill, after the given continuous injection, to wipe out the remaining raw materials from the groove.

Figure 3:
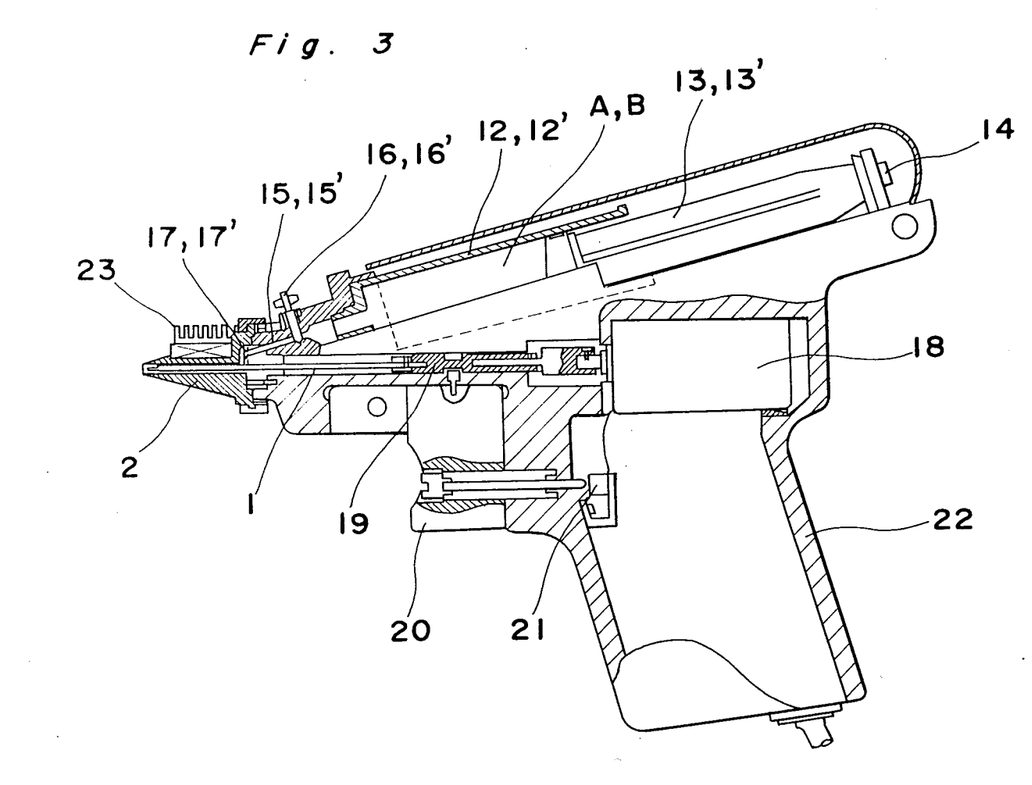
FIG. 3 is a side sectional view of a handy-type dispenser where the mixing method of the present invention has been used in a practical application as a dispenser of room-temperature hardening type epoxide bonding agent.

FIG. 3 shows one embodiment wherein the present invention has been applied to the two-liquid type epoxide bonding agent ARALDITE RAPID (tradename of an epoxy adhesive manufactured by the Ciba-Geigy Corp., Ltd.) which is available in a handy type of two-liquid mixing dispenser. Plastics-made injector cylinders 12 and 12' for medical use with the raw materials A and B filled therein are connected with the rearward upper portion of the nozzle main-body 2 through which the rotation shaft 1 longitudinally extends. A spring-type pressure jig 14 for pushing the pistons 13 and 13' is interposed between the cylinders 12 and 12'. A valve 16 for stopping the reaction raw-material feed during the nozzle-portion washing operation is provided in the feed routes 15 and 15' of the reaction liquid with respect to the nozzle main-body 2 from each cylinder 12 and 12'. Numerals 17 and 17' are the reaction raw-material discharge openings which come into contact against one portion of the outer peripheral face of the rotation shaft 1 of each feed route 15 and 15'. The rotation shaft 1 is coupled by a coupling portion 19 to DC motor 18 disposed behind it. A switch 21 which starts and stops the motor rotation, together with a trigger 20 for the rotation shaft projection use operation is switched with fingers in the pistol style, is provided in the dispenser main-body 22 portion grasped by the hand. A semiconductor cooling unit 23 composed of the thermo-module is provided on the nozzle main-body 2 portion as one example wherein a method of mixing two-liquid reaction raw materials using the delay of the reaction is realized by the cooling operation.

By such construction as described hereinabove, the two-liquid mixing type epoxide bonding agent of the room-temperature hardening type, which was conventionally difficult to be used may be continuously used under intermittent operation for eight hours or more, using such characteristics in a plurality of liquid mixing as shown in the embodiment.

Figure 4:
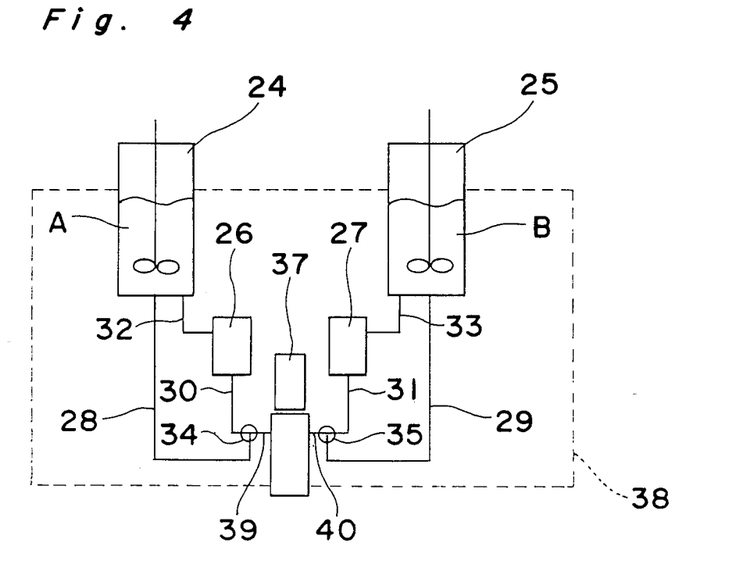

FIG. 4 is a schematic view of the construction in one embodiment of an application, in liquid casting process molding, which uses a nylon/anion polymerization material having only a twenty-second gellation time, of the mixing method of the present invention. Pipings 28, 30, 32 and 29, 31, 33 for circulating each raw-material A and B are respectively connected with tanks 24, 25 for preserving two kinds of reaction raw materials A and B in molten condition. The pipings respectively have pressure feed pumps 26, 27, three-way valves 34, 35 for controlling the circulation and the discharging provided halfway, are connected in three-way valves 34, 35 to a mixing nozzle 36 similar in the embodiment with feed routes 39, 40. A motor and cylinder valve 37 which rotates the rotating shaft (not shown) and/or moves it longitudinally with respect to the nozzle main body, in oil chamber or in air chamber 28 which respectively adjust the temperatures to 80° C. through 100° C. in the case of the nylon reaction molding material, to 120° C. through 150° C. in the case of polyesteramide are provided.

Thus, the mixing method as exemplified in the embodiment is performed in a liquid casting process.

The second embodiment of the present invention will be described hereinafter. The washing or cleaning operation of the rotation shaft is performed through manual wiping in the first embodiment. However, in the present embodiment, the washing method where the automatic mixing of the reaction materials may be performed so that the time required from the mixing to the hardening may be shortened.

Figure 5A:
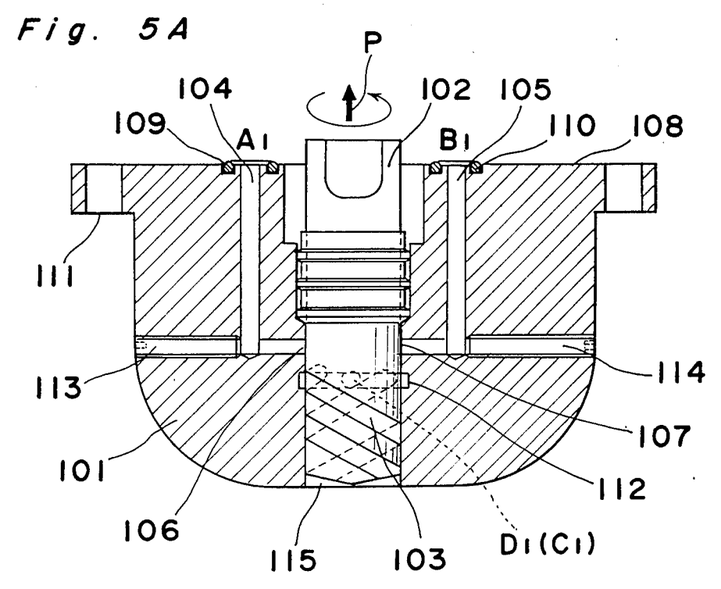
FIGS. 5A and 5B show a sectional view of the mixing head of a grooved rotation shaft system in another embodiment of the present invention.
Figure 5B:
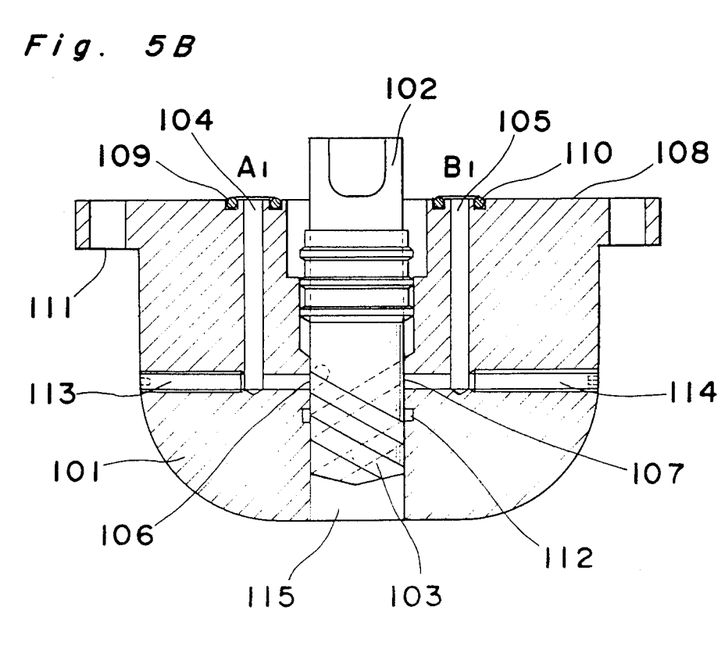
Figure 6:
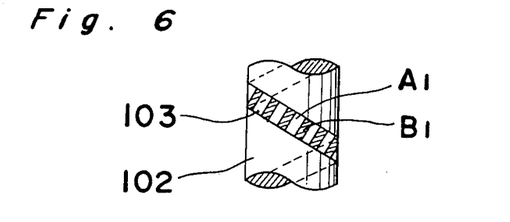
FIG. 6 is a view for illustrating a portion of the rotation shaft.

The second embodiment of the present invention is shown in FIG. 5 through FIG. 8. FIG. 5 is a sectional view showing the mixing head of a grooved rotation shaft system having a groove of one line or more in the periphery in accordance with the present invention. The mixing head of the grooved rotation shaft system is provided with a head main-body 101, and a rotation shaft 102 having a drill groove 103 in the peripheral face. A piping connection opening 104 for primary agent A1, a liquid leakage preventing packing 109, a discharge opening 106 for primary agent A1, a connection opening 105 for the hardening agent B1, a packing 110, a discharge opening 107 for the hardening agent B1, an $N_2$ gas discharge opening C1 for a washing operation and a discharge opening for washing agent (ϵ-caprolactam) D1, a ring-shaped washing groove 112 so that the groove 103 of the rotation shaft 102 may be washed with the rotation shaft 102 being kept stopped are disposed. Blind plugs 113, 114 for maintenance use are provided in the pipings of the primary agent A1 and the hardening agent B1. It is to be noted that the blind plugs 113, 114 may be improved stop valves. FIG. 5A shows the condition during the washing operation of the groove 103, where the raw-material discharge openings 106, 107 are blocked in the grooveless portion of the rotation shaft 102. During the mixing injection, the rotation shaft 102 is moved in the direction of an arrow P, the groove 103 shown in FIG. 5B is caused to conform in position to the discharge openings 106, 107. Then, the primary agent A1 and the hardening agent B1 are sequentially scraped into the groove 103 as shown in FIG. 6 by the high-speed rotation, mixed into layer condition and injected from the injection opening 115. It is to be noted that the mounting face 108 of the head main-body 101 is mounted on the super unit through clamping by the use of the bolt hole 111. Also, it is preferable to wash only the groove 103 of the shaft 102 in the condition of FIG. 5A in the washing operation. The positive washing may be performed with a small amount of washing fluid.

Figure 7:
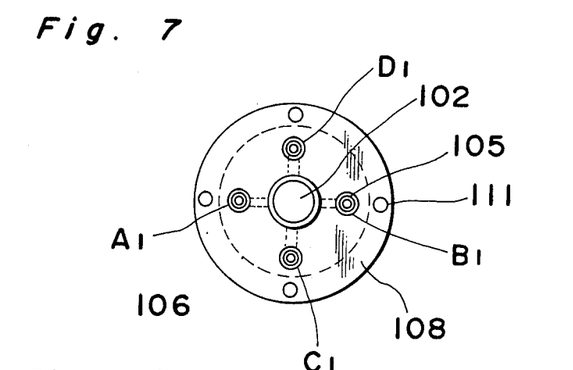
FIG. 7 is a plan view of the mixing head of FIG. 5.

FIG. 7 shows a plan view of FIG. 5. The arrangements of the respective piping connection openings of the primary agent A1, the hardening agent B1, the washing gas C1, and the washing liquid D1 are shown.

Figure 8:
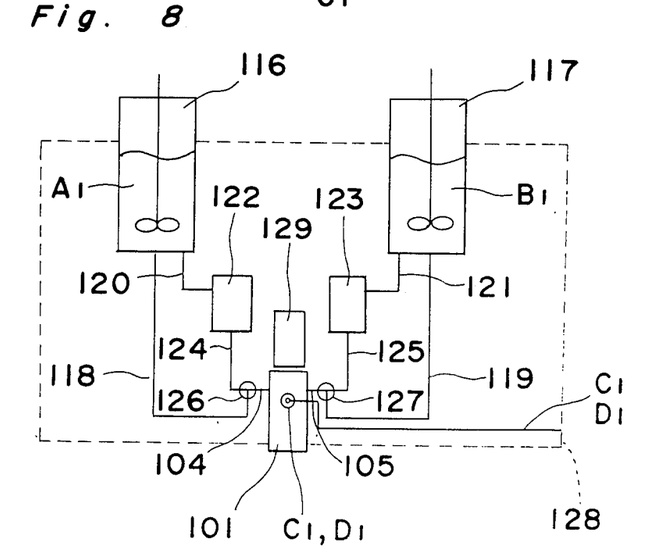
FIG. 8 is a schematic view showing the flow of a nylon liquid casting process-molding machine using the mixing head of the present invention.

FIG. 8 shows the schematic view of the construction of the nylon liquid casting process molding machine 128 using the mixing head. The primary agent A1 is fed from the raw-material tanks 116, 117 of the primary agent A1, the hardening agent B1 is fed circulating through the piping 120, the gear pump 122, the piping 124, the three-way valve 126 and the piping 118. The hardening agent B1 is fed circulating through the piping 121, the gear pumping 123, the piping 125, the three-way valve 127 and the piping 119. During the injecting operation, the three-way valves 126, 127 are operated to flow the raw-materials into the piping connected to the piping connection openings 104, 105 for A1, B1. The motor driving portion 129 is operated simultaneously with the operation of the three-way valve to move upwardly rotation shaft 102 for the simultaneous start of the rotation. At this point, the washing route is closed. After the discharging operation of a given amount of raw materials, the three-way valves 26, 27 are operated in the circulation direction, and the rotation shaft 102 is simultaneously moved downwardly as shown in FIG. 5A. The discharge openings 106, 107 are closed, simultaneously the washing liquid D1 is discharged in a small amount, thereafter the washing $N_2$ gas C1 is discharged to complete the washing operation of the groove 103. The injection is performed in such a cycle as described hereinabove. It is to be noted that when the shaft is not rotated during the washing operation, the washing opening is preferably formed as a ring-shaped groove on the periphery of the rotation shaft. In this case the groove may be washed where the rotation shaft stops. Also, the washing opening may be provided in one portion on the periphery of the rotation shaft, in such case the washing operation may be effected by the relative rotation of the rotation shaft.

The grooves consisting of a plurality of lines are preferable. Because of the existence of a little gap between the rotation shaft and the cylinder of the mixing head, abrasion resistance occurs. It is preferably for the materials between the rotation shaft or the inside of the cylinder with fluorine resin coating compositions.

According to the present invention, the effect of precisely mixing, even a little amount, a comparatively small amount of a plurality of reaction materials, which have a short gellation time from mixing to hardening, by alternate scraping by means of the groove of the rotation shaft is provided so that mixing precision is much better than in manual mixing, they are not left as they are after the mixing operation, the bonding property is kept high, the bonding agent to be discarded as waste is less. This is the handy type where the amount from a small amount to some amount may be controlled by the number of rotations, by the feed transfer force, by the adjustment of the groove depth, or by the diameter of the rotation shaft. Thus, this invention may be applied from the dispenser for bonding use to the liquid casting process or molding machine, thus resulting in a large industrial value. Also, the mixing may be further promoted through the stirring operation by the releasing of a plurality of raw materials, scraped alternately by grooves, into the same portion of the nozzle tip end. In the apparatus provided with temperature control means in the raw-material feed transfer or the given route of the mixing, the mixing operation in accordance with the condition of the use, the non-use of each type of mixture may be performed, the reaction speed may be controlled to make the gellation time longer.

Also, according to the present invention, the mixing head capable of performing the automatic washing operation in the case of the mixing of the reaction raw materials short in the gellation time from the mixing to the hardening. Also, the residual washing liquid is reduced for washing the groove of the shaft, furthermore the raw-material discharge opening the washing liquid discharge opening are blocked in the no-groove of the shaft for independence, thus making it possible to have the automatic washing operation. The head is capable of raw-material mixing stable in hardening reaction property to reduce the amount of washing liquid used.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A method of mixing and discharging a plurality of liquid reaction materials, by providing a mixing and discharging apparatus including a rotation shaft having at least one peripheral groove in the peripheral surface thereof, a complementary cylinder substantially surrounding the rotation shaft, at least two discharge openings in the cylinder for feeding respective liquids therein, and a mixed materials injection opening at one end of the cylinder for discharging mixed liquid reaction materials therefrom, said method comprising the steps of:

supplying respective liquid reaction materials to the at least two discharge openings;

rotating the rotation shaft relative to the complementary cylinder for aligning a first one of the plurality of grooves with a first one of the at least two discharge openings for allowing a flow of a first liquid reaction material into the aligned first groove;

further rotating the rotation shaft relative to the complementary cylinder for scraping off a portion of the first liquid reaction material from the first one of said at least two discharge openings;

still further rotating the rotation shaft relative to the complementary cylinder for cutting off the flow of the first liquid reaction material from the first one of said at least two discharge openings;

further rotating the rotation shaft relative to the complementary cylinder for aligning the first one of the plurality of grooves with a second one of the at least two discharge openings for allowing a flow of a second liquid reaction material into the first groove;

still further rotating the rotation shaft relative to the complementary cylinder for scraping off a portion of the second liquid reaction material from the second one of said at least two discharge openings;

further rotating the rotation shaft relative to the complementary cylinder for cutting off the flow of the second liquid reaction material from the second one of said at least two discharge openings;

repeating the above rotation steps for feeding alternating respective portions of the first and second liquid reaction materials into the first groove of the at least one peripheral groove;

the rotation of the rotation shaft relative to the complementary cylinder feeding the alternating respective portions of the first and second liquid reaction materials toward the injection opening, and being sufficiently fast for mixing the respective alternating portions of the first and second liquid reaction materials owing to the shearing force induced between the relatively moving cylinder and the first and second liquid reaction materials contained within the first groove; and discharging the mixed first and second reaction materials from the mixed materials injection opening.

2. A method of mixing and discharging a plurality of liquid reaction materials, by providing a mixing and discharging apparatus including a rotation shaft having at least one peripheral groove in the peripheral surface thereof, a complementary cylinder substantially surrounding the rotation shaft, at least two discharge openings in the cylinder for feeding respective liquids therein, the rotation shaft and complementary cylinder defining therebetween a mixing space at one end thereof for a final mixing of the plurality of liquid reaction material, and a mixed materials injection opening at the said one end of the cylinder for discharging mixed liquid reaction materials therefrom, said method comprising the steps of:

supplying respective liquid reaction materials to the at least two discharge openings;

rotating the rotation shaft relative to the complementary cylinder for aligning a first one of the plurality of grooves with a first one of the at least two discharge openings for allowing a flow of a first liquid reaction material into the aligned first groove;

further rotating the rotation shaft relative to the complementary cylinder for scraping off a portion of the first liquid reaction material from the first one of said at least two discharge openings;

still further rotating the rotation shaft relative to the complementary cylinder for cutting off the flow of the first liquid reaction material from the first one of said at least two discharge openings;

further rotating the rotation shaft relative to the complementary cylinder for aligning the first one of the plurality of grooves with a second one of the at least two discharge openings for allowing a flow of a second liquid reaction material into the first groove;

still further rotating the rotation shaft relative to the complementary cylinder for scraping off a portion of the second liquid reaction material from the second one of said at least two discharge openings;

further rotating the rotation shaft relative to the complementary cylinder for cutting off the flow of the second liquid reaction material from the second one of said at least two discharge openings;

repeating the above rotation steps for feeding alternating respective portions of the first and second liquid reaction materials into the first groove of the at least one peripheral groove;

the rotation of the rotation shaft relative to the complementary cylinder feeding the alternating respective portions of the first and second liquid reaction materials toward the injection opening, being sufficiently fast for mixing the respective alternating portions of the first and second liquid reaction materials owing to the shearing force induced between the relatively moving cylinder and the first and second liquid reaction materials contained within the first groove, and the rotation being sufficiently fast for further mixing the plurality of liquid reaction materials in the mixing space at the one end of the cylinder; and discharging the mixed first and second reaction materials from the mixed materials injection opening.

* * * * *